United States Patent
Sand

(10) Patent No.: US 6,273,208 B1
(45) Date of Patent: Aug. 14, 2001

(54) VARIABLE DISPLACEMENT VEHICLE ENGINE AND SOLID TORQUE TUBE DRIVE TRAIN

(76) Inventor: Darrel R. Sand, 4777 Ottawa Dr., Okemos, MI (US) 48864

( * ) Notice: Subject to any disclaimer, the term of this patent is extended or adjusted under 35 U.S.C. 154(b) by 0 days.

(21) Appl. No.: 09/173,408

(22) Filed: Oct. 15, 1998

(51) Int. Cl.⁷ .................................................. B60K 5/02
(52) U.S. Cl. .................................... 180/299; 180/300
(58) Field of Search .................................... 180/299, 300, 180/233, 291, 380, 381, 382; 123/481, 198 F

(56) References Cited

U.S. PATENT DOCUMENTS

| | | |
|---|---|---|
| Re. 28,675 | 1/1976 | Hobbensiefken . |
| 2,708,003 | 5/1955 | Nallinger et al. . |
| 2,756,835 | 7/1956 | Muller . |
| 3,167,149 * | 1/1965 | Miller et al. ........................ 180/380 |
| 3,542,147 * | 11/1970 | Shakespear et al. ................ 180/380 |
| 3,732,942 | 5/1973 | Hobbensiefken . |
| 3,842,927 | 10/1974 | Tantlinger . |
| 3,998,290 * | 12/1976 | Sivers et al. ........................ 180/380 |
| 4,040,395 | 8/1977 | Demetrescu . |
| 4,064,844 | 12/1977 | Matsumoto et al. . |
| 4,080,947 | 3/1978 | Iizuka . |
| 4,331,113 | 5/1982 | Tadokoro et al. . |
| 4,506,757 | 3/1985 | Matsumoto et al. . |
| 4,533,010 | 8/1985 | Harder . |
| 4,585,088 | 4/1986 | Ward . |
| 4,650,030 | 3/1987 | Moriyama et al. . |
| 4,709,778 | 12/1987 | van Sivers . |
| 4,867,260 * | 9/1989 | Cameron et al. ................... 180/233 |
| 5,036,943 * | 8/1991 | Kashiwagi ......................... 180/380 |
| 5,067,582 * | 11/1991 | Muller et al. ...................... 180/380 |
| 5,267,623 | 12/1993 | Kashiwagi . |
| 5,282,518 * | 2/1994 | Yamasaki et al. ................. 180/233 |
| 5,437,253 * | 8/1995 | Huffmaster et al. ............... 123/481 |
| 5,503,129 * | 4/1996 | Robichaux et al. ............... 123/481 |
| 5,540,633 | 7/1996 | Yamanaka et al. . |
| 5,636,609 | 6/1997 | Fujiyoshi . |
| 5,645,032 * | 7/1997 | Motose ............................... 123/481 |
| 5,669,357 * | 9/1997 | Denz et al. ........................ 123/481 |
| 5,732,680 * | 3/1998 | Ninomiya et al. ................ 123/481 |
| 5,758,616 * | 6/1998 | Motose ............................... 123/481 |
| 5,797,371 * | 8/1998 | Nonaka .............................. 123/481 |
| 5,803,040 * | 9/1998 | Biesinger et al. ................ 123/481 |
| 5,826,563 * | 10/1998 | Patel et al. ........................ 123/481 |
| 5,884,603 * | 3/1999 | Matsuki ............................. 123/481 |
| 5,930,992 * | 8/1999 | Esch et al. ......................... 123/481 |

* cited by examiner

*Primary Examiner*—Lanna Mai
*Assistant Examiner*—Jeffrey J. Restifo
(74) *Attorney, Agent, or Firm*—Young & Basile, PC

(57) ABSTRACT

A variable displacement engine for a vehicle has a sequential fuel injector firing order to sequence the fuel injector firing signals to the fuel injectors of each cylinder of the engine in a sequential manner regardless of the number of cylinders which are operated under any given engine load. A connecting bridge connects the injector firing signals as determined by the engine controller for the desired number of operative cylinders under any load to the fuel injectors in a sequential, manner as the bridge sequences through positions after each injector firing cycle. A solid torque tube system rigidly interconnects the engine, the transmission and the rear axle of the vehicle to form a solid torque member having a natural frequency of oscillation higher than any vibrational frequency that can occur during operation of the vehicle. A rigid torque tube is fixedly connected between the transmission and the rear axle. A universal pivotal connection mounts one end of the engine to the vehicle to allow rotational movement of the solid torque tube system about at least two mutually exclusive axes. A force absorption apparatus is coupled to the solid torque tube system for absorbing forces impacting on the solid torque tube system causing longitudinal fore or aft movement of the solid torque tube system. In one embodiment, the force absorption apparatus is coupled through a switchable valve to a source of modulated torque fluid pressure to assist force absorption under high torque loads.

28 Claims, 7 Drawing Sheets

VARIABLE DISPLACEMENT VEHICLE ENGINE AND SOLID TORQUE TUBE DRIVE TRAIN

BACKGROUND OF THE INVENTION

1. Field of the Invention

The present invention relates, in general, to vehicles and, specifically, to variable displacement vehicle engines and more specifically, to vehicle drive trains.

2. Description of the Art

Vehicle engines are typically provided with an even number of combustion cylinders, i.e., 4, 6, 8, etc., even though certain engine designs with an odd number of cylinders, such as 5 cylinders, are also known. The amount of fuel/air injected into each cylinder is dependent upon the position of the throttle or accelerator pedal and determines the resulting power applied to the vehicle wheels and the speed of the vehicle. A preset fuel/air mixture is provided under idle conditions when the driver has disengaged his or her foot from the accelerator pedal.

It is known that fuel economy can be significantly improved by stopping the operation of some of the vehicle cylinders under light or partial load driving conditions. In such so-called "variable displacement engines," the injection of fuel into certain cylinders is stopped, with only the remaining cylinders continuing to operate. Various control schemes have been devised to determine the number of cylinders which are operating or rendered inoperable under various driving load conditions.

While variable displacement engines have proven to significantly increase fuel economy and, consequently, to reduce fuel emissions, variable displacement engines create two objectionable problems. First, when a cylinder has ceased operation for a considerable period of time, the temperature of the cylinder wall and other surfaces within the cylinder drop as compared to the continuously operating, fuel burning cylinders. The cooler, inoperative cylinders are required under various power needs to suddenly resume operation when power demand increases. This can cause combustion inefficiency compared with the continuously operated, warmer cylinders and brings about a lower average fuel burning efficiency and an increase in fuel consumption and results in higher pollution exhaust gases from the colder operating cylinders. One approach to address this problem is to constantly shift which specific cylinders are working or nonworking under any load condition according to a preset sequence.

Another problem created by variable displacement engines is a result of inevenly spaced, intermittently operated cylinders anti creates objectionable torsional vibration in the passenger cabin as a result of an unbalanced engine operation when the engine is mounted in a conventional manner intimately connected to the cabin. Such vibrations have inhibited the use of variable displacement engine designs since the vibrations, when transmitted to the passenger compartment, are objectionable.

In a conventional rear wheel drive vehicle, power is transferred from the engine and transmission through a drive shaft to the rear axle and then to the two rear wheels. Since the engine is typically mounted in a conventional fore and aft manner on the frame via engine mounts or on an engine cradle or sub-frame intimately connected with the passenger cabin frame rails, any torsional engine vibrations are transferred from the engine to the passenger cabin or through the transmission and rear axle to the vehicle body via the rear wheels which are connected to the vehicle body by springs and shock absorbers. In addition, forces or shocks are transferred via the rear wheels to the passenger cabin as a result of uneven or rough transmission shifts as well as by shocks introduced on the rear wheel by rough pavement, potholes, etc. The end result of all of these forces which are transmitted to the passenger cabin is an uncomfortable ride for the vehicle passengers.

Torque tube type drive trains have been previously used on rear wheel drive vehicles. For example, a torque tube rigid to the rear axle was connected by a universal ball joint to the rear end of the transmission. The engine in this drive train was mounted to the vehicle by a pair of side positioned rubber mounts in an attempt to cushion engine torsional vibrations from the frame rails connected to the passenger cabin.

Thus, it would be desirable to provide a variable displacement engine which overcomes the problems associated with previously devised variable displacement engines. It would also be desirable to provide a variable displacement engine which maintains the temperature of inoperative cylinders at a minimum temperature suitable for efficient combustion and low pollution emissions when the inoperative cylinders are abruptly brought back into an operative state. It would also be desirable to provide a variable displacement engine with a unique drive train which isolates the torsional engine vibrations and other forces generated by the rear wheels of the vehicle from the passenger cabin. It would also be desirable to provide such a unique drive train which can be easily adapted to current vehicle rear wheel drive trains.

SUMMARY OF THE INVENTION

There is disclosed herein a unique variable displacement engine fuel injector firing means in which fuel injector signals are connected to a selected number of fuel injectors under the control of a throttle controlled switch driven by an engine controller which selects the number of cylinders to be operative under any driving load condition. The unique injector firing signal controlling means sequences between states or positions after each complete injector firing cycle to connect the injector firing signals to all of the other cylinders of the engine in a sequential, rolling manner so as to maintain the temperature of each cylinder above a minimum temperature associated with efficient fuel combustion.

According to the present invention, the variable displacement engine includes a plurality of cylinders, each provided with a fuel injector for injecting fuel into each cylinder oil a timed basis controlled by injector firing signals from an engine controller. The engine controller, in response to varying engine loads, selects any number of the maximum number of cylinders for operation at any given time.

Means connects each fuel injection firing signal from the engine controller to a fuel injector. Means cycle the fuel injector connecting means to all of the cylinders in the engine in a sequential manner in the selected number of operative fuel injectors at a time.

Means are also provided for advancing the fuel injector connecting means one position to connect the selected number of fuel injector firing signals to different fuel injectors upon each sequential generation of the fuel injector signals for the selected number of cylinders.

There is also disclosed herein a unique solid torque tube system for a rear wheel drive vehicle drive train which rigidly interconnects tile engine, the transmission and the rear axle such that the natural frequency of oscillation of the rigidly interconnected engine, the transmission and the interconnecting means is higher than any vibrational frequency that can occur during operation of the engine and vehicle.

In a preferred embodiment, the interconnecting means comprises the engine rigidly fixed to the transmission and a rigid torque tube rigidly connected at one end to the transmission and rigidly fixed at an opposed second end to the rear axle. Preferably, the interconnecting means, the engine and the transmission are substantially co-axial with the longitudinal axis of the vehicle.

Means are provided for pivotally connecting the engine to the vehicle chassis for pivotal movement of the rear axle about an axis horizontally transverse to a longitudinal axis of the interconnecting means with respect to the vehicle chassis. The pivotally connecting means preferably comprises a universal pivotal connection mounted between the vehicle chassis and one end of the engine. The pivotally connecting means also includes means for allowing the interconnecting means to pivot about two mutually exclusive axes with respect to the vehicle chassis.

In one embodiment, the pivotally connecting means includes a pivot bar connected to and extending from the engine, and means, fixed to the vehicle chassis, for movably receiving the pivot bar and allowing rotation of the pivot bar about a longitudinal axis of the pivot bar and, also, longitudinal movement of the pivot bar. Preferably, the pivotally connecting means allows rotation of the pivot bar about two mutually exclusive axes.

Dampening means is also coupled to the pivot bar for dampening longitudinal movement of the pivot bar. In one embodiment, the dampening means comprises force absorption means coupled to the pivot bar. A piston rod is coupled to the pivot bar and to a piston slidably mounted in a closed housing. The housing is fixedly connected to stationary vehicle structure, such as, for example, to the front vehicle frame cross rail. The piston forms first and second separate fluid filled chambers in the housing on opposite sides of the piston. A restrictor orifice is formed in the piston creating a restrictive fluid flow path between the first and second chambers.

The force absorption means also includes a source of torque compensating fluid on the vehicle which generates a fluid pressure proportional to the transmission torque, and means, coupled to the source of torque compensating fluid and to the first and second chambers in the piston housing, and responsive to longitudinal movement of the piston rod, for controlling fluid flow to and from the first and second chambers to modulate fluid flow between the first and second chambers in proportion to the magnitude of the longitudinal movement of the piston rod.

The fluid flow controlling means preferably comprises a valve spool slidably mounted in a closed housing and coupled to the pivot bar. The valve spool is movable between a first position blocking fluid flow between the source and one of the first and second chambers, and a second position directing fluid flow from the source of torque compensating fluid to one of the first and second chambers depending upon the direction of movement of the valve spool. The valve spool is preferably a bi-directionally movable valve spool. A check valve is disposed between the source of torque compensating fluid and the valve spool to prevent back flow from the valve to the source of torque compensating fluid. The closed housing containing the valve spool is stationarily mounted on the vehicle.

The solid torque tube system of the present invention provides significant advantages over previously devised vehicle drive train configurations by isolating any rotational vibrations generated by the engine from being transmitted to the vehicle cabin. The solid torque tube system (STTS) of the present invention is particularly useful with controllable variable displacement engines in which one or more cylinders may be rendered temporarily inactive for improving fuel economy and for reducing pollution where such engines with various inactive cylinders would be commercially impractical because of undesirable, uneven torsional vibrations transmitted to the passenger cabin of such improved fuel economy, low pollution type vehicles.

The STTS drive train makes such vehicles commercially practical by means of isolating any uneven or erratic torsional vibration frequencies generated by any uneven firing engines by means of a unique combination of self-contained structural members that provide a torsionally rigid mass with a natural frequency of torsional rigidity that is of greater magnitude than any frequency of vibration that would be generated by any combination of firing impulses generated by the power source of the vehicle. This high natural frequency designed into the stiff structure of STTS prevents any engine vibrations from building up to sympathetic frequencies that would be disturbing to passengers during operation of the vehicle.

The STTS of the present invention also softens and smooths out and makes imperceptible any fore and aft impulse forces exerted by the rear wheels when generated by engine torque variations or by transmission up-shifts or down-shifts. This lessens any ciscomfort to the vehicle passengers during operation of the vehicle.

The unique force absorption means of the present invention assists in absorbing any longitudinal fore and aft movement of the solid torque tube system by means of the combined inertia mass of the engine, transmission, drive line shafting, and rear axle assembly. The total STTS mass acts, as an inertia energy absorber and performs as a barrier in opposition to any fore and aft movement from forces generated by sudden changes in the rear wheel tractive effort. This lessens any discomfort to vehicle passengers during operation of the vehicle.

The forward location of the STTS mass acts as an inertia ballast in opposition to any upward or downward vertical torque arm forces caused by sudden changes in rear wheel tractive effort. As in the event of sudden forward tractive effort, the upward force of the STTS torque arm is mollified and subdued by the STTS inertia, thereby reducing vertical reaction forces from the torque arm from being transmitted to the vehicle cabin by virtue of the inertia mass of the combined weight of the engine, transmission, axle to transmission coaxial connector, and the axle assembly. This lessens any up and down forces from the front pivot end of the solid torque tube apparatus which could cause discomfort to the passengers in the vehicle cabin.

The STTS of the present invention is particularly useful in eliminating noise vibrations generated by exhaust systems, including exhaust converters, mufflers, pipes, and resonators where exhaust members are typically supported by exhaust hangers attached to the bottom of the vehicle cabin. The STTS provides a means of eliminating all exhaust system hangers fastened to the floor of the passenger compartment, thereby eliminating transmission of noise and vibration booming typically conducted from the exhaust system hangers fastened to the floor of the passenger cabin. This lessens noise discomfort to vehicle passengers during operation of the vehicle. Elimination of exhaust hangers is accomplished by solidly attaching the entire exhaust system to the STTS assembly, thereby isolating the exhaust away from the passenger cabin. The STTS of the present invention is also particularly useful in increasing the life of exhaust pipes and connectors by eliminating bending and vibrational stresses that are typically in high cost, and shorten the life of exhaust systems in conventional vehicles.

The STTS of the present invention is also particularly useful in increasing the safety of hydraulic brakes by eliminating the dangerous flexing long brake hose between the floor of the passenger cabin and the rear axle which is a typical unsafe practice in conventional vehicles. This feature is accomplished in the present invention by attaching the hydraulic brake pipe firmly along the full-length of the STTS assembly. A short, low-flex brake hose near the master cylinder replaces the long hose.

The STTS of the present invention is particularly useful in eliminating body-roll steering error of the rear axle and rear wheels during turning maneuvers and by heavy throttle torque steer by maintaining the straight forward rolling direction of the rear axle and wheel assembly. The STTS provides a precise guidance of rear wheels by virtue of the long torque arm of the STTS which acts as, a positive wagon-tongue directional guide for the rear axle and rear wheels. This lessens the danger of loss of steering during aggressive turning and during aggressive acceleration.

The STTS of the present invention eliminates all universal joints in the drive line between the transmission and the rear axle which reduces out-of-balance vibrations caused by drive shaft runout. The STTS drive line is rigid; therefore, no universal joints are needed.

The STTS of the present invention is also particularly useful in eliminating slip joints in the drive line between the transmission and the rear axle. Elimination of the slip joints eliminates slip joint grunt noise when a vehicle completes a stop and comes to rest. The STTS drive line is rigid and there is no change in length between the transmission and axle when vehicle comes to rest after braking to a stop.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
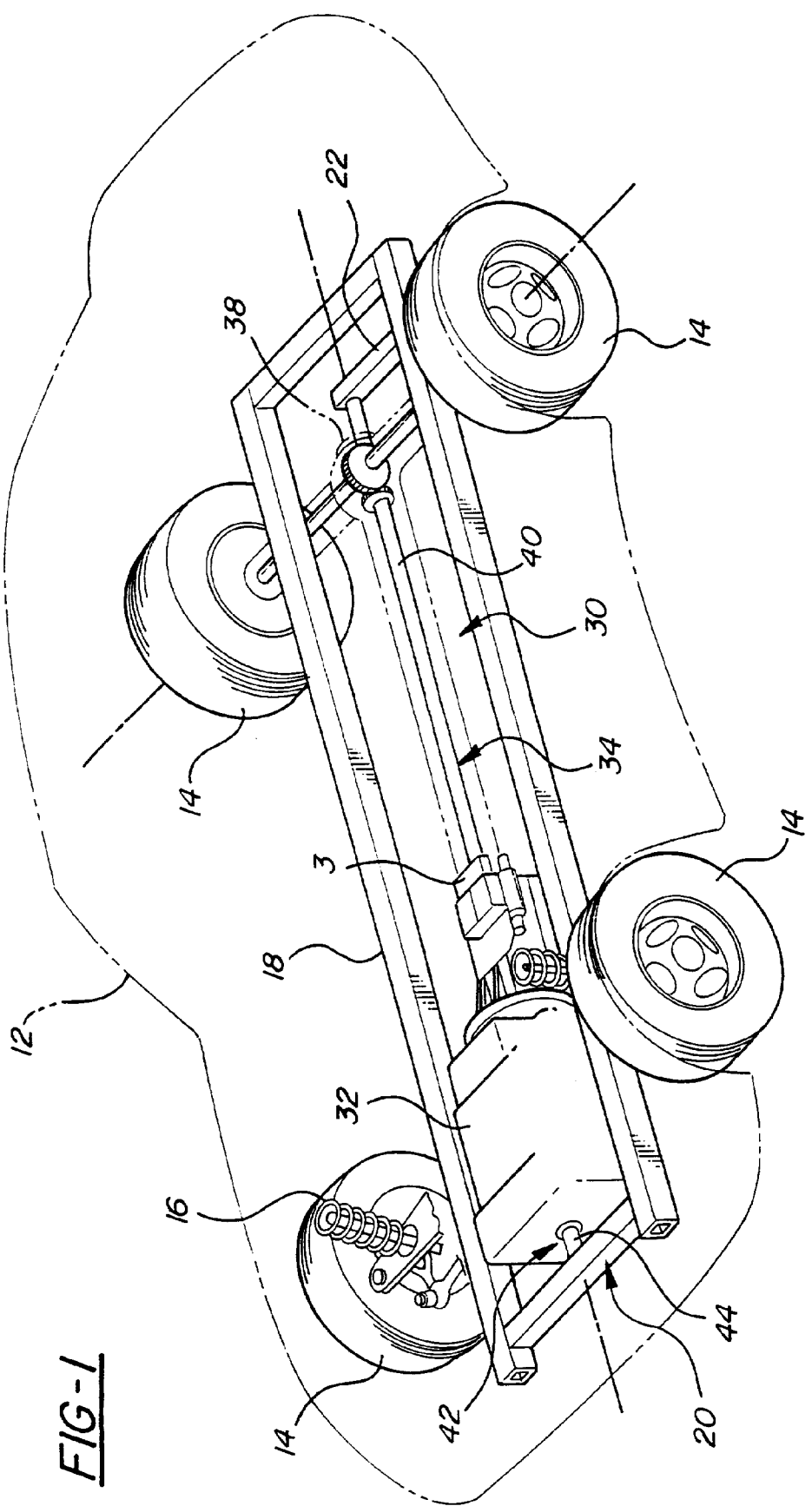
FIG. 1 is a perspective view of a vehicle having the solid torque tube system of the present invention mounted therein.

Referring now to the drawing, and to FIGS. 6A–6D and 7, in particular, there is depicted a fuel injector firing sequencing circuit operative to not only select the number of cylinders in an engine for operation by selectively coupling fuel injector firing signals to the selected fuel injector for the selected number of cylinders, but also cycling the means for connecting the fuel injection firing signals or pulses to the respective fuel injectors in a sequential cycling manner so that all of the cylinders are fired the number of cylinders selected by the engine controller to be firing or operative at any one time, so as to maintain the temperature of all of the cylinders, including the nonoperative cylinders, at a minimum temperature to provide efficient fuel combustion when a particular cylinder abruptly changes from an inoperative to an operative state.

In FIGS. 6A–6D there is depicted fuel injection signals 201, 202, 203 and 204 which are associated with the first, second, third and fourth cylinders of a four cylinder engine. It will be understood that a four cylinder engine is described hereafter by way of example only as the present control configuration may be used in vehicle engines having any number of cylinders, including either odd and even numbers of cylinders.

In a conventional constant displacement vehicle engine, the fuel injection signals 201, 202, 203 and 204 would normally be directly connected to each fuel injector 205, 206, 207 and 208, respectively. However, in the variable displacement engine of the present invention, a throttle controlled switch or contactor 209 is provided for controlling the number of cylinders of the four cylinder engine which are to be operative at any one time. As is conventional, an engine controller, not shown, is responsive to engine load and accelerator or throttle position among other factors to determine the number of cylinders of the maximum number of cylinders in the engine needed to meet the power load requirements of any driving conditions. Under low load or idling conditions, the engine controller may deactivate certain cylinders thereby operating the engine on one or two cylinders, for example, to increase fuel economy and reduce unacceptable emissions.

In the present invention, a plurality of conductors 210, 211, 212 and 213 are selectively connected to the conductors carrying the fuel injector signals 201, 202, 203 and 204 and the throttle control switch 209 contacts. By way of example, sliding movement of the throttle control switch 209 under control of the engine controller will select one cylinder, two cylinders, three cylinders or all four cylinders of the engine for operation at any one driving condition. Movement of throttle switch 209 in an opposite direction may cut out or deactivate certain cylinders thereby causing the engine to operate with one, two or three cylinders less than the total number of four cylinders in the engine.

It will also be understood that the engine controller or ECU could also implement the function of the throttle controlled switch 209 hy only generating the required number of fuel injector firing signals 201, 202, etc.

According to the present invention, means 230 are provided for connecting the fuel injection firing signals 201, 202, 203 and 204 generated by the engine controller on a timed basis to the selected fuel injectors 205, 206, 207 and 208.

In the present variable displacement engine, the engine controller will still generate the four fuel injector firing signals or pulses 201, 202, 203 and 204 on a timed basis, such as consecutively, or in any selected order. However, the engine controller via the throttle control switch 209 will select the number of cylinders which are to be operative under a given driving load condition. The cycling means 230 is, by example only, a contact or bridge arrangement of electrical contacts, brushes or bus bars, which are selectively connectable to and slidable along the conductors 210, 211, 212 and 213 and provide sliding contact with selected contacts associated with the fuel injectors 205, 206, 207 and 208.

Figure 6A:
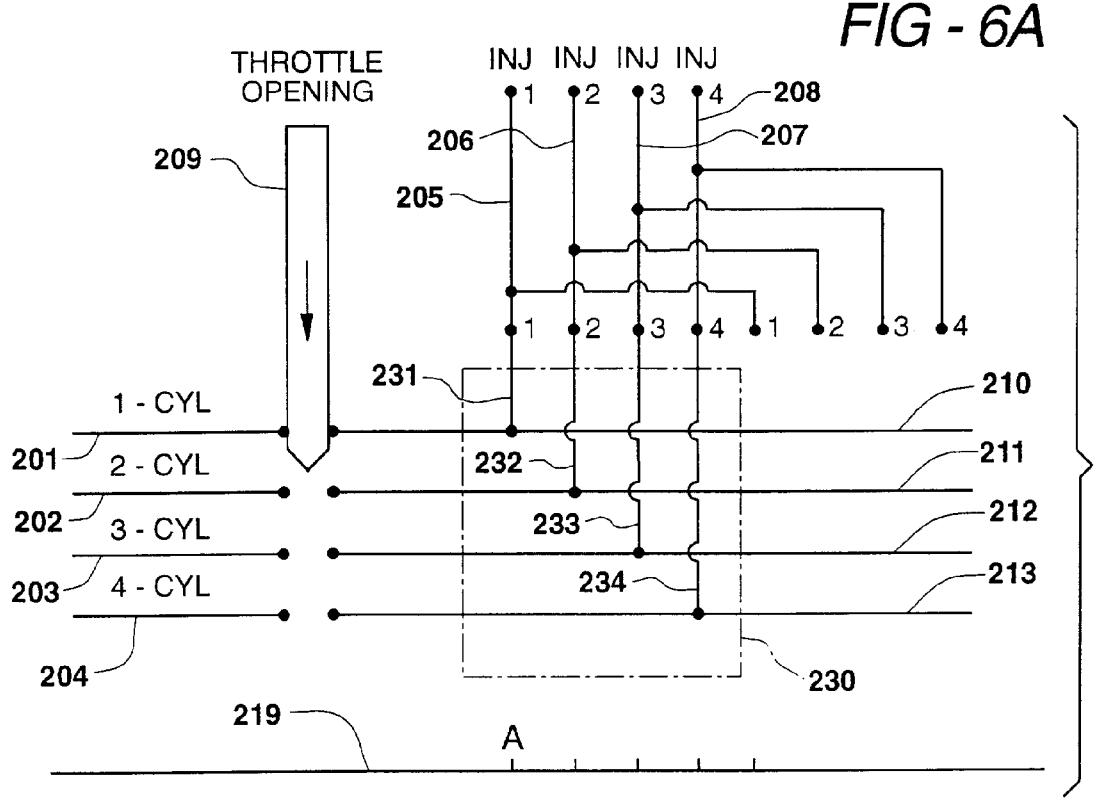
FIGS. 6A–6D are pictorial representations of an electrical circuit for activating and deactivating individual fuel injectors in a rolling, firing sequence.

In operation, if one cylinder is selected for operation, and three cylinders are idled, the cycling means 230 will initially take the position shown in FIG. 6A in which switch contacts or leads 231, 232, 233 and 234 extend from the conductors 210, 211, 212 and 213, respectively, to contacts or terminals labeled 1, 2, 3 and 4 respectively associated with the fuel injectors 205, 260, 207 and 208. The throttle opening switch, in a one cylinder operative condition, will connect the fuel injector firing signal or pulse 201 through the contact 231 to the first fuel injector 205 thereby operating and causing fuel combustion in the first cylinder. Since the throttle controlled switch 209 does not connect the signals 202, 203, and 204 to the conductors 211, 212 and 213, no firing signals are supplied lo the second through fourth cylinders.

In order to maintain the temperature of all four cylinders of the engine above a minimum temperature suitable for efficient fuel combustion, the connecting means or bridge 230 selectively move, as described hereafter, through a series of positions, as shown in FIGS. 6A–6D to consecutively connecting the repeatedly generated fuel injector firing signal 201 to the remaining fuel injectors 206, 207 and 208, one at a time each time that the firing signal 201 is generated by the engine.

Figure 6B:
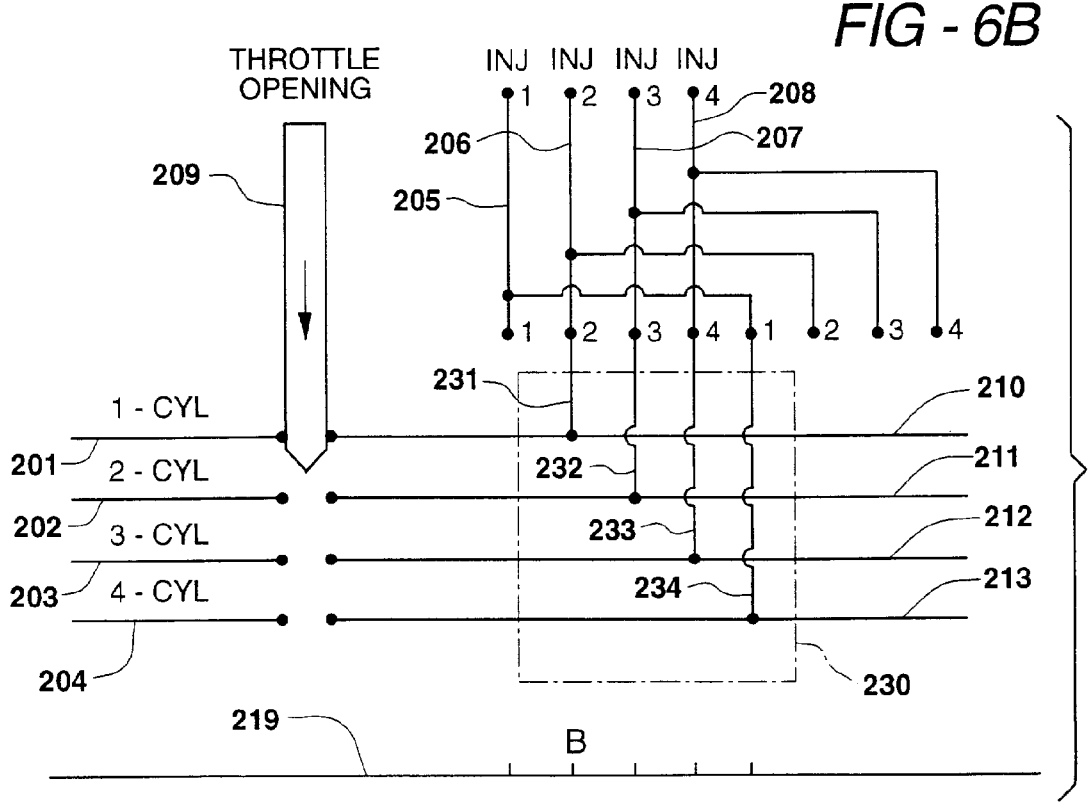

In FIG. 6B, the bridge 230 has moved to a second position labeled "B" in which the contact 231 is connected to the second fuel injector 206 thereby transmitting the injector firing signal 201 through the throttle control switch 209 to the second fuel injector 206.

Figure 6C:
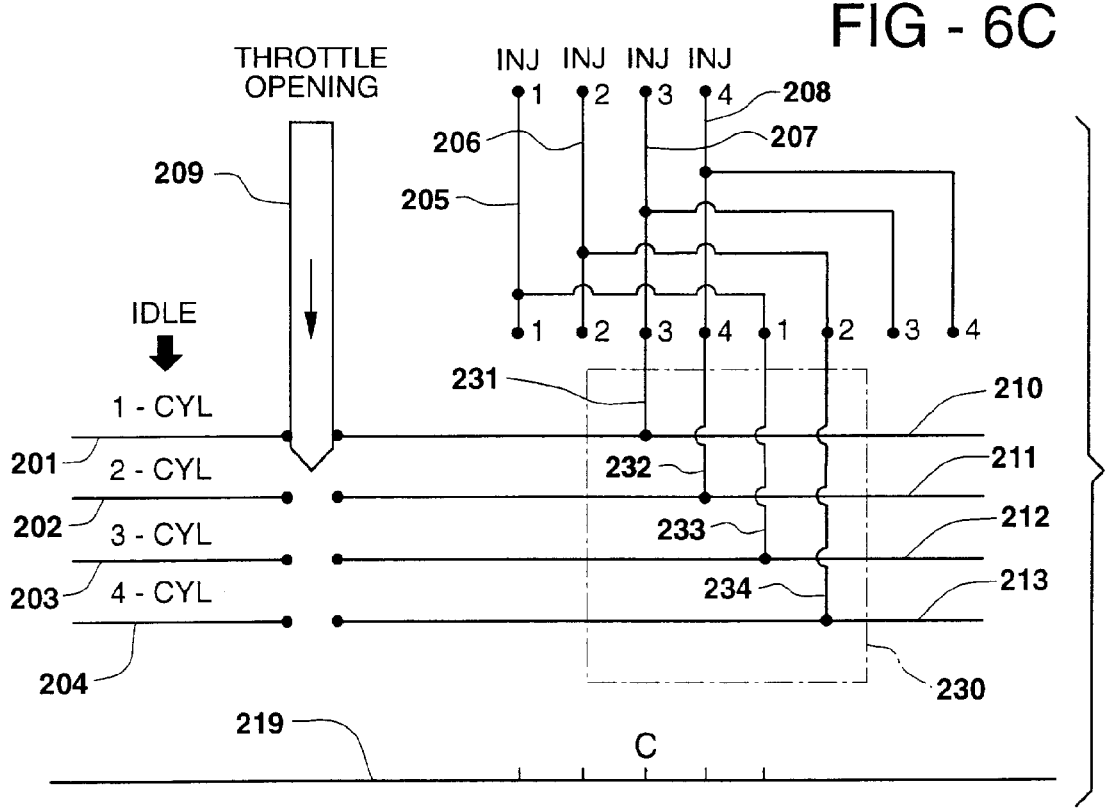
Figure 6D:
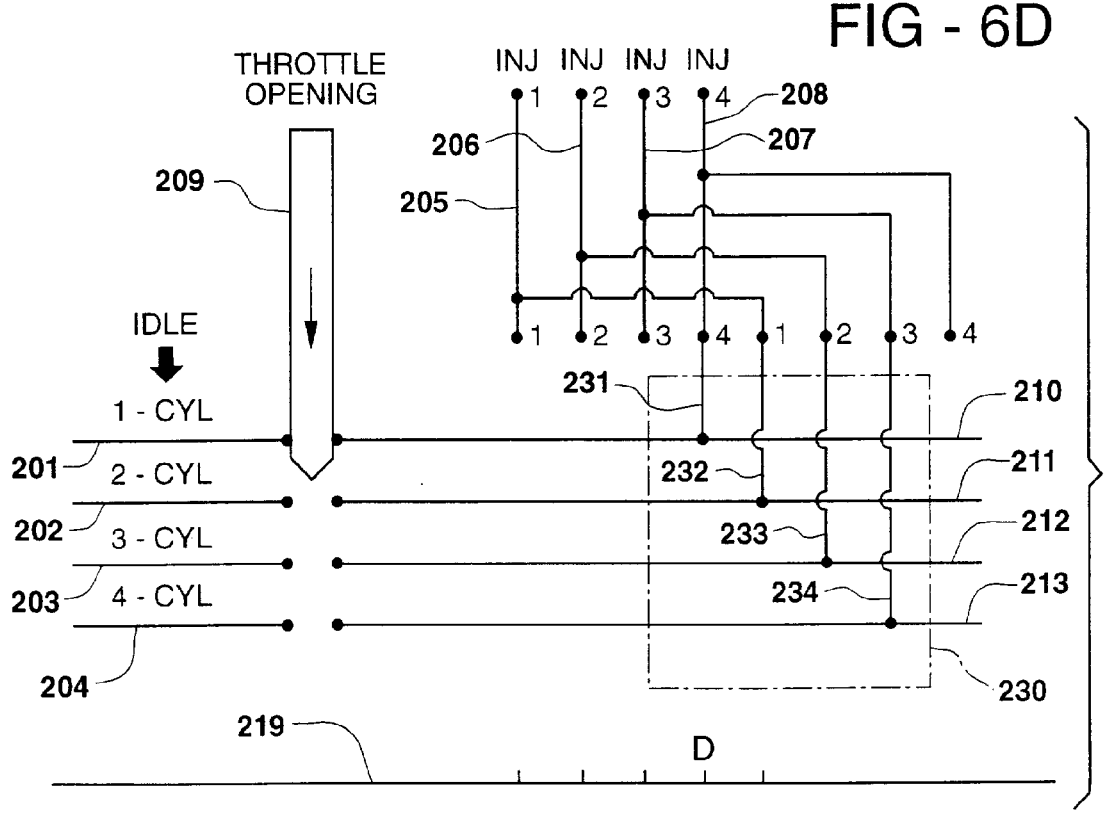

The bridge 230 consecutively cycles through a third and fourth position, respectively labeled "C" and "D" in FIGS. 6C and 6D selectively connecting the injector firing signal 201 to the third and fourth injectors 207 and 208. The cycling means 230 then is repositioned to the "A" position shown in FIG. 6A for the next firing cycle.

It should be noted in each of the four positions labeled A, B, C and D in FIGS. 6A–6D of the bridge 230, the contacts 232, 233 and 234 respectively connected to the conductors 211, 212 and 213 are disposed in contact with one of the fuel injectors 205–208. However, since the throttle control switch 209 has not bridged or connected the injector firing signals 202, 203 and 204 to the conductors 211, 212 and 213, additional injectors are not fired or operated A similar sequence occurs when the throttle controlled switch, 209, under engine control, selects two, three or even the full four cylinders of the engine for operation.

When two cylinders of the engine are to be operated the throttle controlled switch is moved to a position connecting signals 201 and 202 to the conductors 210 and 211. In this manner, in each position A, B, C and D of the cycling means 230, two injector firing signals 201 and 202 are connected to two of the injectors. In the "A" position shown in FIG. 6A, the injector firing signals 201 and 202 will be connected by the bridge 230 to the injectors 205 and 206. In the next firing position, shown in FIG. 6B, the bridge 230 in the second or "B" position will connect the injector firing signals 201 and 202 to the second and third injectors 206 and 207, respectively. In a third or "C" position of the bridge 230 shown in FIG. 6C, the bridge 230 connects the first and second injector firing signals 201 and 202 to the third and fourth injectors 207 and 208, respectively.

In the fourth or "D" position, the bridge 230 connects the two injector firing signals 201 and 202 to the fourth and first cylinders 208 and 205, respectively.

A similar sequence is used for a three cylinder and a four cylinder engine operation.

In general, by causing the bridge 230 to sequentially engage all of the injectors 205–208, all of the engine cylinders are fired in a rolling or continuous firing order, with the number of cylinders fired in any firing sequence selected by the engine controller at the maximum number of cylinders or any number of cylinders less than the maximum number of cylinders.

Figure 7:
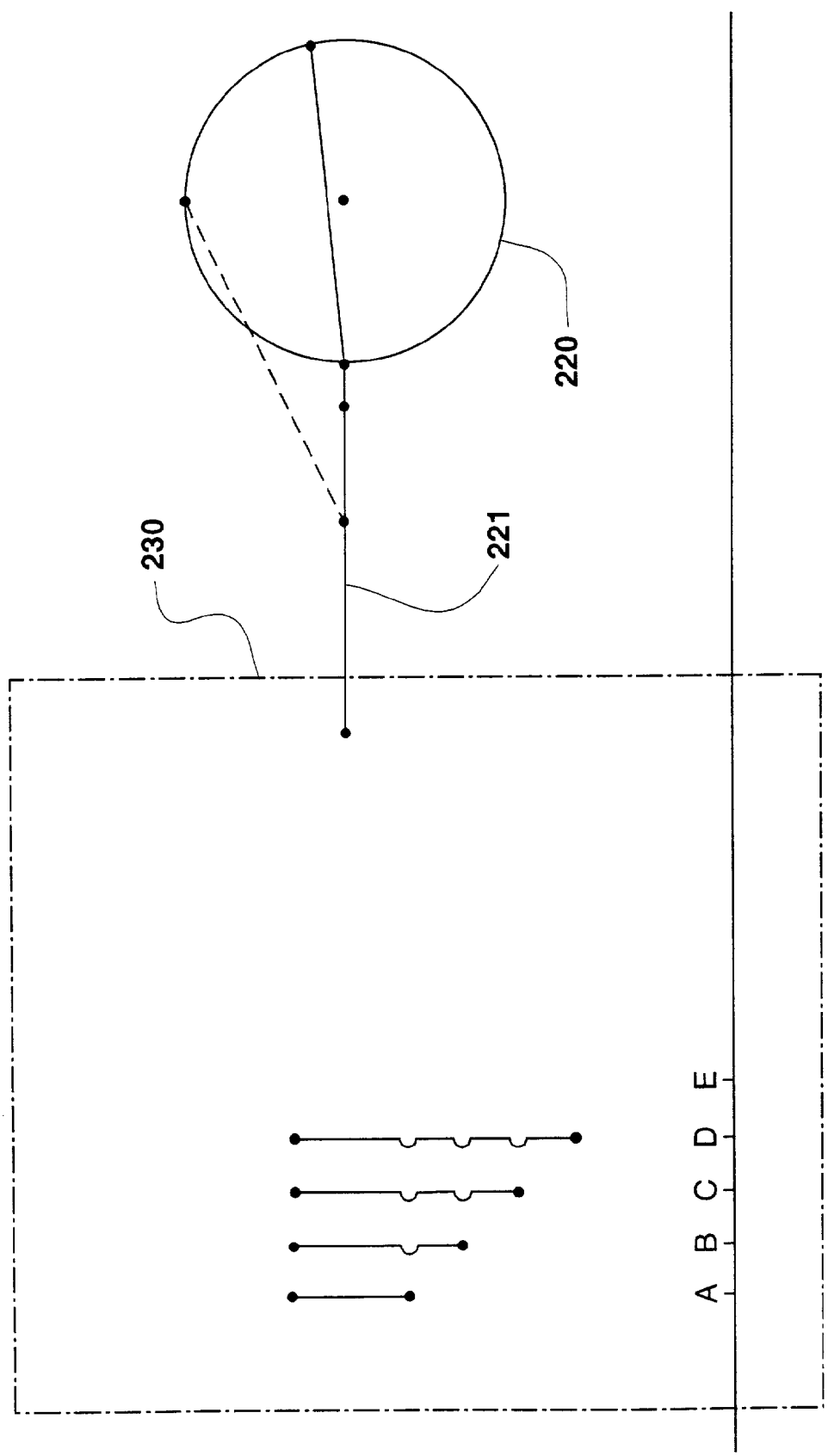
FIG. 7 is a pictorial representation of a eccentric and connecting rod for moving the bridge assembly across the electrical connectors shown in FIGS. 6A–6D.

FIG. 7 depicts an example of a rotatable eccentric 220 which is connected to a rod 221. Rotation of the eccentric 220 by a timed mechanical connection to the engine, for example, causes reciprocal movement of the rod 221. One end of the rod 221 is connected to the bridge 230 to sequentially move the bridge 230 between the four positions A, B, C and D described above.

Although the variable displacement engine with the sequential or rolling firing order of the present invention may be employed with any conventional vehicle drive train, it is preferred that tale variable displacement engine of the present invention be employed with a vehicle drive train which is adapted for absorbing and/or minimizing the vibrational torque and rotation caused by the reduced number of cylinders which may be operative in the variable displacement engine.

Figure 2:
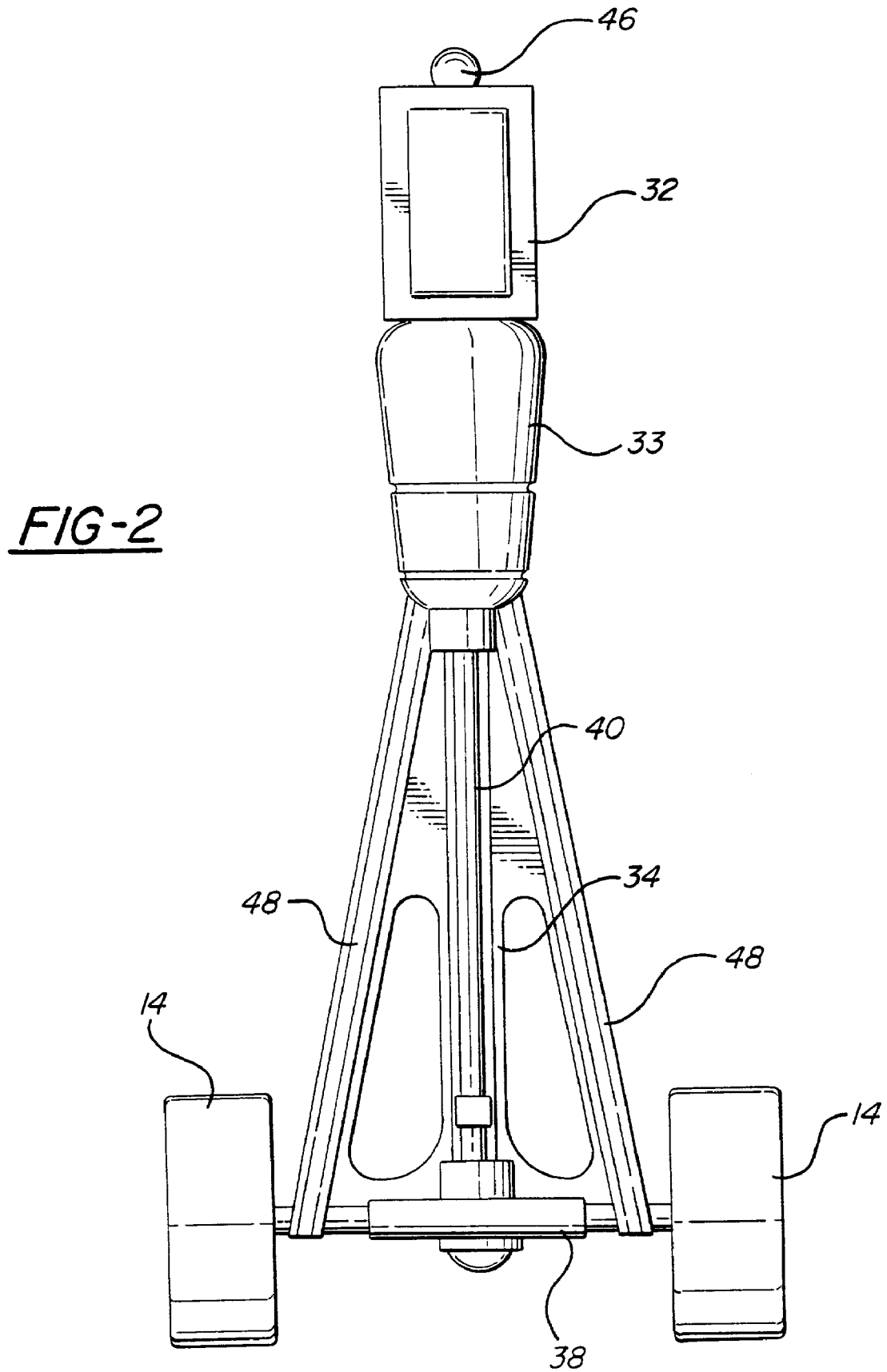
FIG. 2 is a rear perspective of the solid torque tube system of the present invention.

Referring now to FIGS. 1 and 2 in particular, there is depicted a solid torque tube system (STTS) apparatus 10 which forms part of the powertrain of a vehicle 12.

The vehicle 12 is of conventional construction including four wheels 14, each mounted by means of a shock absorber and coil spring assembly 16 to the vehicle frame. The vehicle frame is formed of a pair of frame rails 18 extending longitudinally along both sides of the vehicle 12. The frame rails 18 are connected at a forward end 20 by means of a front cross rail 20. The rear cross rail 22 interconnects the rear end of the frame rails 18.

The present solid torque tube system or STTS denoted generally by reference number 30 is formed of a rigidly interconnected arrangement between a vehicle engine 32, a vehicle transmission 33, a torque tube or torque member 34 and a rear axle housing 38. The engine 32 is rigidly connected to vehicle transmission 33 by suitable means such as by connecting the housing of the transmission 33 to the rear end of the engine 32 by fasteners, welds, etc. The engine 32 may be any conventional internal combustion or other engine used to propel a vehicle. Preferably, however, the engine 32 comprises a variable displacement engine having the rolling firing cylinder order of the present invention as described above.

The torque tube 34 comprises a tubular member surrounding the drive shaft 40 and extending between the output shaft end of the transmission 33 housing and the differential housed within the rear axle housing 38 and may take any suitable form, such as an elongated cylindrical member, square, rectangular, polygonal, or other cross section, such as an open sided U-shaped member. The torque tube 34 is rigidly connected at a forward end to the output end of the transmission housing 33 and to the rear axle housing 38 at an opposite end such as by bolted flanges thereby forming a rigid, unitary, one piece assembly between the engine 32, the transmission 33, the torque tube 34 and the rear axle housing 38.

Means are provided for rotationally connecting the solid torque tube system 30 to the vehicle 12 to cause the entire solid torque tube system 30 to rotate as a single unitary system or member about a longitudinal axis extending through the solid torque tube system 30 generally along the longitudinal axis of the vehicle 12. The mounting means preferring comprises a rotatable connection 42, such as a simple ball and socket connection wherein a shaft 44 projects forwardly from the engine block 32 and terminates in a ball 46, as shown pictorially in FIGS. 1 and 2. The ball 36 engages a rotatable, socket connection carried on the front cross member 20. In this manner, upward movement of either rear wheel 14 causing a tilting of the rear axle or axle housing 38 or any upward or downward tilt resulting from forward tractive effort during acceleration between the rear wheels 14 and the ground or from deceleration forces between the wheels and the pavement will be absorbed by rotation of the entire solid torque tube system 30 without transmission of such forces to the passenger cabin of the vehicle 12.

In FIG. 2, a pair of rear struts 48 are connected between a forward end of the torque tube 34 and opposite outboard ends of the rear axle housing 38 merely for stability. It will be understood that the use of the rear struts 48 is optional only, but are useful for preventing the rear axle 38 from rotating about the centerline of the torque tube system 30.

The rotatable connection or ball and socket 42 described above provides movement of the solid torque tube assembly 30 about two mutually exclusive axes, preferably two mutually exclusive, perpendicular axes, one extending along the longitudinal axis of the solid torque tube assembly 30 and a second axis oriented horizontally perpendicular to the longitudinal axis of the solid torque tube assembly 30 through the ball and socket 42. In this manner, upward movement of the entire rear axle 38 will cause the solid torque tube assembly 30 to pivot about the second axis; while upward movement of one rear wheel will cause rotation of the apparatus 30 about the first axis.

Figure 3:
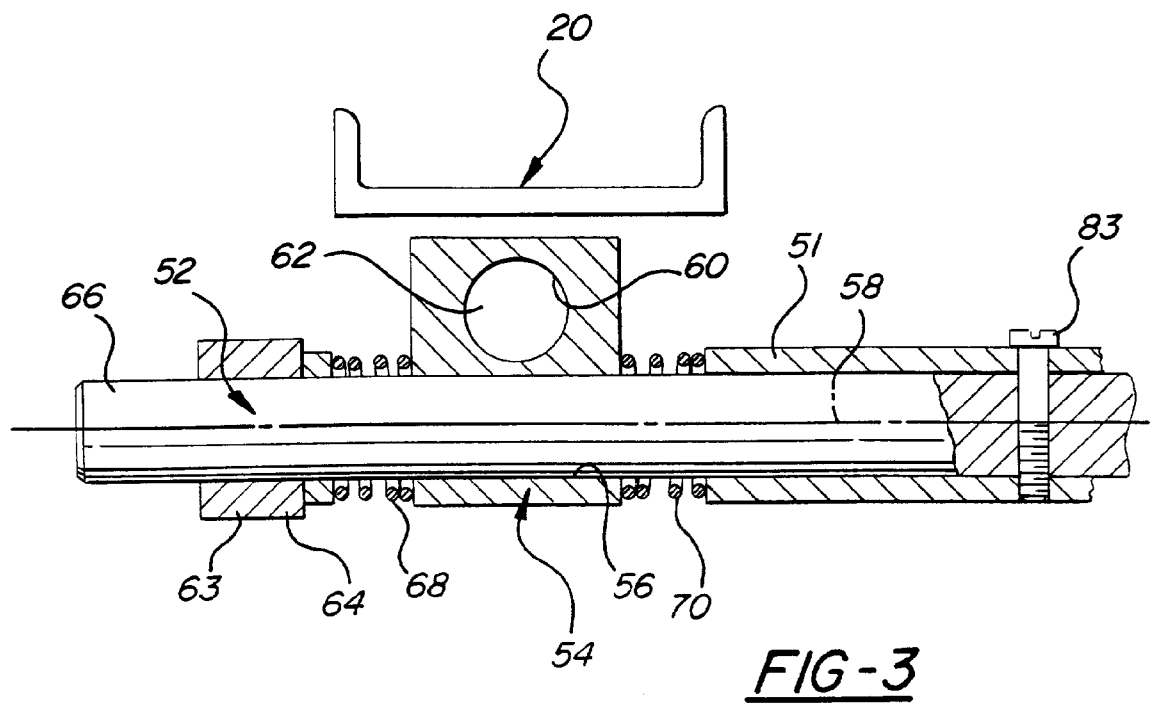
FIG. 3 is a side elevational view of a pivot attachment for the solid torque tube system shown in FIGS. 1 and 2.

Referring now to FIG. 3, there is depicted an alternate embodiment of a mounting means employed to mount the forward end of the solid torque tube assembly 30 to the vehicle frame, such as to the vehicle front cross frame or rail 20. In this embodiment, the mounting means include an elongated, tubular rod 52 which is fixedly connected by mechanical fasteners 53, welding or other means to a tube 51 extending from the forward end of the engine block 32, not shown. Preferably, the rod 52 has a tubular shape with a circular cross section. A pivot block 54 is fixedly mounted by means of a hanger and resilient cushions or bumper pads to the front cross frame member 20. The pivot block 54 which may have any suitable shape, is preferably formed of a high strength, metallic material has a first bore 56 extending therethrough and rotatably receiving the pivot rod 52 to enable rotation of the pivot rod 52 about the longitudinal axis 58 extending along the pivot rod 52 and the longitudinal axis of the solid torque tube assembly 30. A second transverse bore 60 receives a circular cross section hanger member 62 which is connected in nonmetal-to-metal contact by means of resilient cushions or rubber bushings 61 and U-shaped clamps 65 to the front cross frame rail 20. The hanger rod 62 is pivotal about the longitudinal axis extending substantially horizontally transverse to the longitudinal axis 58 thereby allowing the entire solid torque tube assembly 30 to pivot about such axis relative to the front cross frame rail 20.

A centering means is provided for centering the pivot block 56 in a centered position relative to the front cross frame rail 20 while allowing forward and rearward movement of the pivot rod 52 during acceleration or deceleration forces as described above. The centering means includes a support tube 51 fixed to the engine block and fixedly carrying the pivot tube 52 therein by means of a mechanical fastener 53 as shown in FIG. 3. At least one pre-load nut 64 is mounted on a threaded end portion 66 of the pivot rod 52 at a position spaced from a forward end of the pivot block 54 to apply a preload force to the spring 68. A locking nut 63 locks the preload nut 64 in the desired force position.

A pair of centering means, such as compressible, calibrated cushion material or coil springs 68 and 70, are disposed about the pivot rod 52 on opposite sides of the pivot block 54. Thus, the centering spring 68 is seated between a forward surface of the pivot block 54 and the pre-load nuts 64. The second or rear centering spring 70 is seated between the rear surface of the pivot block 56 and a forward end of the support tube 51.

In operation, any rotative forces applied to the solid torque tube assembly 30 from the engine or from tilting of one rear wheel through hitting a chuck hole or rough road surface, as well as rough transmission shifts or acceleration and deceleration of the vehicle 12 will cause relative movement of the pivot rod 52 in either a forward or rearward direction depending upon the direction of the applied force to the solid torque tube assembly 30. Such movement must push the entire torque tube system 30, including the engine 30 and the transmission 32 before compressing one of the springs 68 and 70. The centering springs 68 and 70 will tend to bias the pivot rod 52 back to the normal center position relative to the pivot block 54 as shown in FIG. 3. At the same time, the pivot rod 52 is capable of rotation in the pivot block 54 upon any rotative force applied to the longitudinal axis of the solid torque tube assembly 30. This isolates such rotative forces from the passenger compartment of the vehicle 12. Rearward, upward or downward tilting of the rear wheels 14 also is isolated from the passenger compartment 12 by means of rotation of the solid torque tube assembly 30 about the transverse axis extending through the hanger rod 62.

The solid torque tube assembly 30 and its pivotal mounting 42 to the vehicle 12 has a total mass with a higher torsional rigidity that prevents rotary displacement between the engine block and the rear axle assembly or housing 38. This particularly is important and it is necessary that the torsional rigidity of the solid torque tube system 30 from front to rear have a higher rotational natural frequency than any operational frequency encountered due to erratic engine firing at any engine operating speed.

Figure 4:
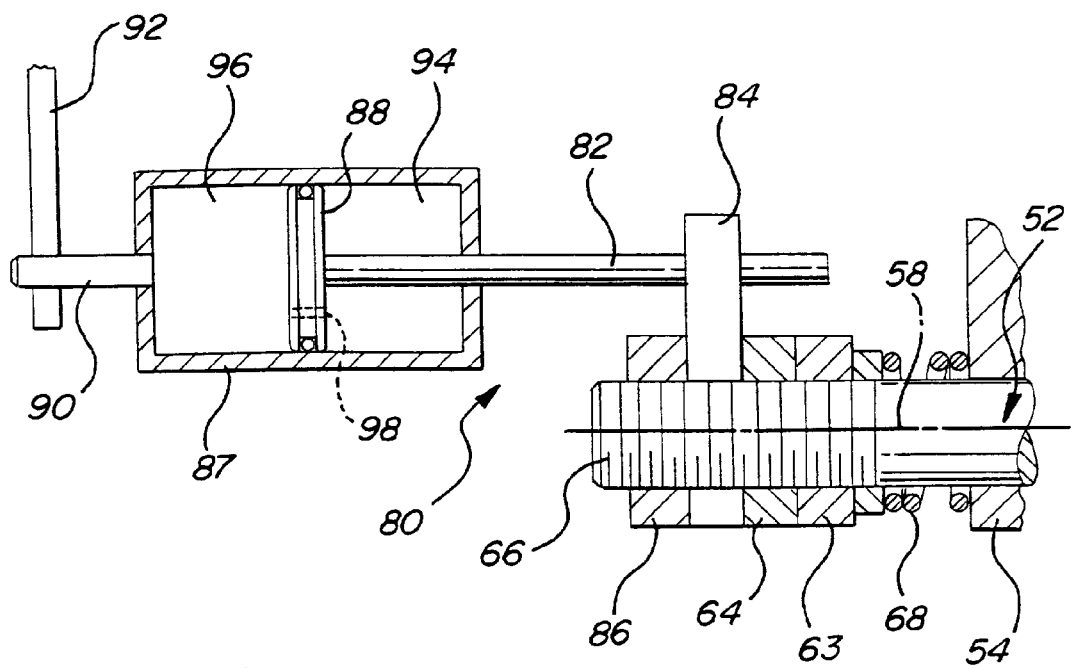
FIG. 4 is a side elevational view of a force dampener according to the present invention.

According to another embodiment of the present invention, as shown in FIG. 4, a force dampener 80 is coupled between the vehicle frame and the solid torque tube assembly 30 to cushion or soften any forward or rearward thrust forces imparting to the solid torque tube system 30 from the rear wheels 14 thereby isolating or minimizing the transmission of such forces to the body of the vehicle 12 and thereby to the passenger compartment and the occupants thereof.

As shown in FIG. 4, the force dampening means 80 comprises a tubular member 82 which is fixedly mounted in a bracket 84 coupled to the end 66 of the pivot rod 52. A mounting nut 86 is threaded over the end 66 of the pivot rod 52 to fixedly mount the bracket 84 in place on the pivot rod 52 and to transmit bi-directional forward and rearward movement of the pivot rod 52 to simultaneous and equal forward and rearward movement of the tubular member 82. A piston housing 87 carries a slidable piston 88 which is attached to one end of the tubular member 82. The piston housing 87 is mounted by means of an arm 90 to a flange 92 fixed to a stationary part of the vehicle, such as a forward end of the vehicle front frame rail 20.

The piston 88 divides the interior of the piston housing 87 into two separate chambers 94 and 96. A restrictive opening or small diameter orifice 98 is formed through the piston 88 placing the first and second chambers 94 and 96 in fluid communication. A suitable fluid, such as hydraulic oil, is disposed in each of the chambers 94 and 96 substantially filling each of the chambers 94 and 96; but allowing volume or space within each chamber 94 and 96 for additional fluid from the opposite chamber 94 and 96.

In operation, forward or rearward thrust forces imparted by the wheels to the solid torque tube system 30 will result in longitudinal forward or rearward movement of the pivot rod 52 depending upon the direction of the thrust force. This forward or rearward movement will be transmitted by the bracket 84 to equal forward or rearward movement of the tubular member 82 and thereby to piston 88. Forward or rearward movement of the piston 88 in the piston housing 87 will be resisted by the fluid in either chamber 94 or 96 in a direction of movement of the tubular member 82. The movement of the piston 88 is resisted by means of the orifice 98 which provides a restricted flow of fluid between the chambers 94 and 96.

In addition to thrust forces from the rear wheels, other shocks or forces exerted on the solid torque tube system 30 which are absorbed by the dampening means 80 occur when the transmission is shifted from neutral to drive or reverse, especially during higher RPMS or cold idle speeds. These shocks as well as the forward shock of wheel hop on irregular pavement and the rearward jolt of chuck holes are absorbed by the force dampener 80 or at the least softened so as to minimize any irritation to passengers in the passenger compartment of the vehicle 12.

Figure 5:
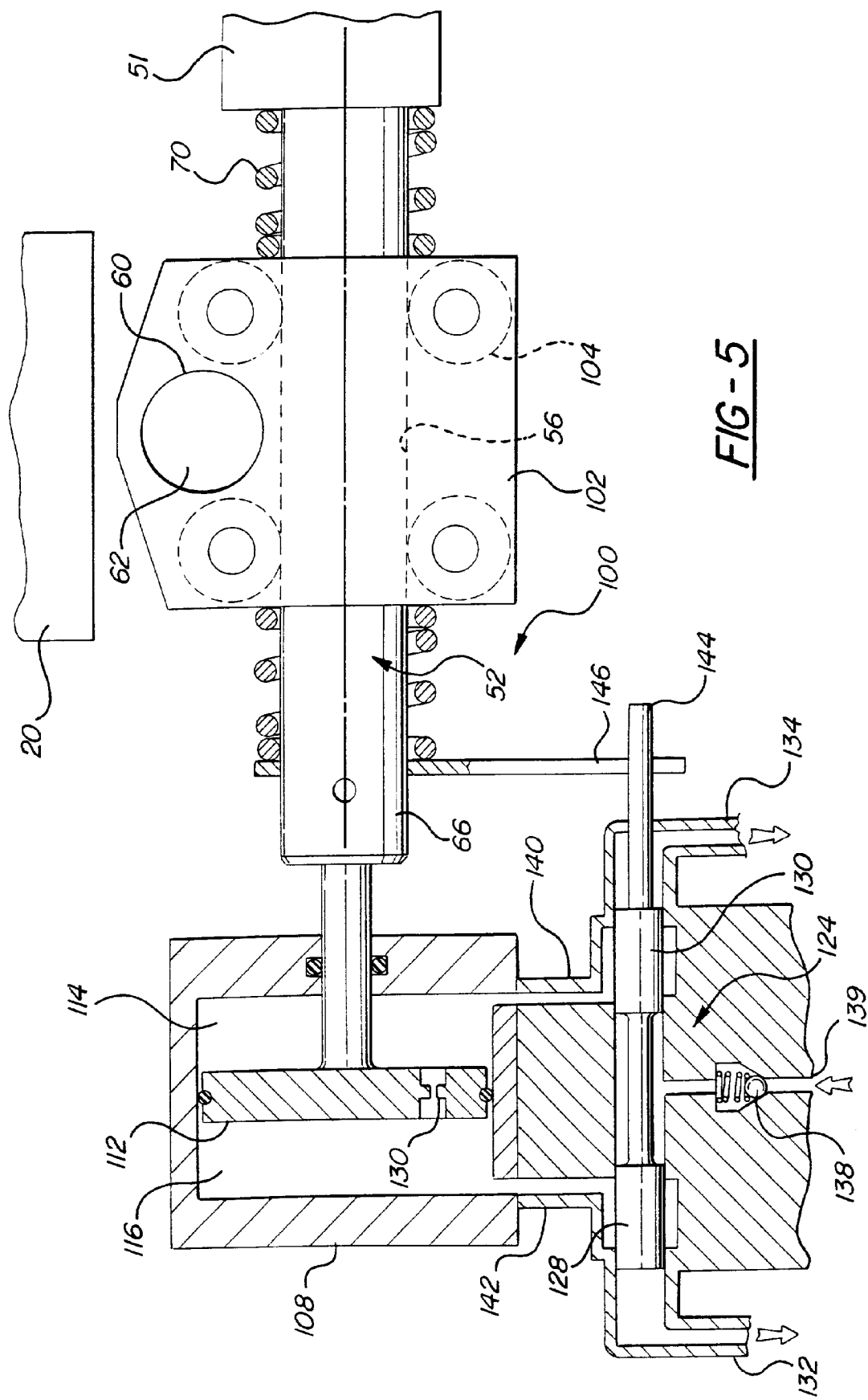
FIG. 5 is a side elevational view of an alternate embodiment of a force dampener according to the present invention.

FIG. 5 depicts another embodiment of a force dampening means 100 according to their present invention. The force dampening means 100 is similar to the force dampening means 80 depicted in FIG. 4 with only several slight modifications. In this embodiment, the pivot block 102 has a transverse pivot bar 56 rotatably and longitudinally receiving the pivot rod 52 therethrough. Centering springs 68 and 70 are disclosed on opposite sides of pivot block 56 about the pivot rod 52 for maintaining the pivot rod 52 in a center position after any force impact on the solid torque tube system 51. The transverse bore 60 receives the hanger rod 62 which is connected to the vehicle body, such as the vehicle front frame rail 20, by means of a hanger assembly formed of the U-shaped clamps 65 and the resilient or rubber cushions 61.

In order to ensure free longitudinal movement or rotation of the pivot rod 52 through the bore 56 of the pivot block 102, a plurality of anti-friction rollers or needle bearings 104 are mounted within the pivot block 102 and are positioned to engage the exterior surface of the pivot rod 52.

A piston rod 106 is fixedly connected to and extends from the end of the pivot red 52 along the longitudinal axis of the pivot rod 52 into a piston housing or body 108 through a sealed connection, such as by an O-ring 110. The piston rod 106 is fixedly connected to a piston 112 slidably mounted in the piston body 108 and dividing the interior of the piston body 108 into a first chamber 114 and second chamber 116. A restriction or reduced diameter orifice or bore 120 is formed in the piston 112 and places the first and second chambers 114 and 116 in fluid communication. The restrictor orifice 120 allows a fluid, such as hydraulic oil, substantially filling each of the chambers 114 and 116 to flow between the chambers 114 and 116 depending upon the direction of movement of the piston 112 while providing resistance to such movement thereby absorbing any forces or sudden jolts or impacts applied to the pivot rod 52 from the transmission or the rear wheels of the vehicle 12 as described above.

The piston 112 is maintained in a center position dividing the chambers 114 and 116 into two equally volumetric sized chambers toy means of the centering springs 68 and 70 disposed on opposite sides of the pivot block 102. This defines the center, rest position of the pivot block 102 and the piston 112.

When the solid torque tube system 30 tends to push the vehicle forward or to the left in FIG. 5, the piston rod 106 moves with the forward or leftward movement of the pivot rod 52 and causes the piston 112 to move to the left compressing the fluid in the chamber 116. This causes resistance to extension or forward movement of the solid torque tube system 30. At the same time, this force causes the fluid in the chamber 116 to flow through the orifice 110 which results in a hydraulic dampening effect on the forward travel or movement of the solid torque tube system 30 thereby reducing any sudden jolt from the solid torque tube system 30 from sharply impacting the vehicle 12 and the passengers within the passenger cabin of the vehicle 12. The same force dampening effect is achieved by a rearward directive force tending to move the pivot rod 52 and the solid torque tube system 30 to the right in the orientation of the FIG. 5.

The embodiment shown in FIG. 5 also includes a unique motion monitoring means responsive to movement of the entire solid torque tube system 30. The motion monitoring means, in a preferred embodiment, includes a valve 124 having an interiorly mounted spool 126 with two end lobes 128 and 130 carried on opposite ends of the spool 126. The valve 124 includes first and second ports 132 and 134 along with suitable connections to a fluid pump, such as the vehicle transmission fluid pump. Another inlet port 136 to the valve 124 is connected through a check valve 138 to a source 139 of torque compensation fluid. Preferably, the torque compensation fluid is the transmission torque compensator oil, the pressure of which increases proportionally in relation to increased engine torque or transmission output torque. Additional ports 140 and 142 on the valve 124 are respectively connected or conduits to the chambers 114 and 116, respectively, in the piston housing 108.

The valve spool 126 is connected by an extension rod 144 to an arm 146 fixedly carried by the end 66 of the pivot rod 52. In this manner, left or right directional movement of the piston rod 52 caused by corresponding movement of the solid torque tube system 30 results in simultaneous and equal left and right movements of the valve spool 126.

The valve spool 126 is normally in the center position shown in FIG. 5 due to the centering action of the springs 68 and 70 on the pivot rod 52. In this center position, the lobes 128 and 130 block fluid flow paths between the ports 142 and 132, and between the ports 140 and 134, respectively, thereby maintaining all fluid within the chambers 114 and 116 of the piston housing 108.

In the event the solid torque tube system 30 suddenly jolts forward, for example, as in response to a rough transmission shift or other disturbance from sudden changes in tractive effort at the rear drive wheels, whether or not the valve 124 comes into play is determined by the amount of the force exerted on the solid torque tube system 30. When the force results only in small left or right (fore or aft) movements of the solid torque tube system 30 and the pivot rod 52, all such movements are dampened by the centering springs 68 and 70. The valve remains essentially in the center position shown in FIG. 5 and does not direct fluid from the source 139 through the check valve 138 and one of the outlets 140 or 142 to one of the piston chambers 114 and 116.

All such gentle or minimal movements of the solid torque tube system 30 are absorbed by the centering springs 68 and 70 and/or fluid within the chambers 114 and 116 of the piston flowing through the restrictor orifice 120 between the chambers 114 and 116. Since it is desirable that the spring force of the centering springs 68 and 70 be low enough to be responsive to only light force impulses resulting from light throttle transmission up-shifts, the low spring load of the centering springs 68 and 70 will cause small movements of the pivotal rod 52 to be imperceptible.

The check valve 138 ensures that under no circumstances will an extremely high, trapped fluid pressure in the chambers 114 or 116 of the piston housing 108 be relieved by back flow to the torque compensator fluid source 139.

The primary function of the valve 124 is to provide a modulated fluid pressure from a torque related fluid source 139, such as an automatic transmission generated compensator control fluid or oil, or an electrically generated torque transmission output, which generates an assisting force to the centering springs 68 and 70 and/or the piston 112. The valve 124 directs torque related control fluid pressure into one of the piston chambers 114 or 116 in a manner in which the fluid pressure increases proportionally in relation to increased engine torque or transmission output torque.

In the instance of an aggressive transmission up-shift that would normally cause a sharp impulse directed to the vehicle body, the solid torque tube system 30 and the attached pivot roof 52 will move abruptly to the left or towards the front of the vehicle in the orientation shown in FIG. 5. The valve spool 126 also moves to the left through the fixed connection of the rod 144 and the arm 146. The abrupt force pulse overcomes the biasing effect of the centering springs 68 and 70 and causes the spool 126 of the valve 124 to move sufficiently to the left to place the port 142 in fluid communication with the source 139 of torque compensated fluid pressure through the check valve 138 thereby supplying the torque compensation fluid to the chamber 116. This provides an assisting force that prevents the spring 70 from bottoming out and causing it to transmit a solid forward shock force to the vehicle body.

In this position of the valve spool 126, port 140 is disposed in fluid flow communication with port 134 thereby providing an outlet fluid flow path from the chamber 114 to the fluid sump. Once the force impulse begins to lessen, the centering springs 68 and 70 will come back into play and urge the pivot rod 52 to the center position. This also moves the valve spool 126 to the center position blocking fluid flow between the ports 140 and 142 and the valve ports 134 and 132, respectively.

The valve 124 also functions in an opposite direction to assist force dampening upon movement of the solid torque tube system 30 and the pivot rod 52 to the right, in the orientation shown in FIG. 5.

In summary, there has been disclosed a unique variable displacement engine having sequential, rolling injector firing order, despite the number of cylinders of the engine which are selected by an engine controller to be operative under any given driving condition or load so as to maintain all of the cylinders above a minimum operative temperature level suited for efficient fuel combustion.

There is also disclosed a unique solid torque tube system for a vehicle which isolates force impulses generated by the rear wheels and/or rough transmission up or down shifts from the vehicle body which could cause discomfort to the vehicle passenger. The solid torque tube system of the present invention is also uniquely mounted to the vehicle allowing the entire solid torque tube system to rotate rotatably about two mutually exclusive axes to again isolate rotative forces generated by the engine or elsewhere from impacting on the vehicle body. The present invention also discloses a unique force dampening means which assists in dampening any longitudinal fore and aft forces applied to the solid torque tube system.

The variable displacement engine with sequential injector firing order and the solid torque tube system may be used separately from each other, such as coupling the variable displacement engine to a conventional vehicle drive train, or using the solid torque tube system with a conventional constant displacement engine or a variable displacement engine without the sequential injector firing order of the present invention. However, the use of the variable displacement engine of the present invention with the solid torque tube system provides many advantages with respect to fuel economy under various driving load conditions and a minimizing or the elimination of substantially all rotational vibrations generated by the engine, the vehicle wheels, uneven transmission shifts, etc.

What is claimed is:

1. In a vehicle with an engine having a plurality of cylinders, each cylinder provided with a fuel injector for injecting fuel into each cylinder on a timed basis controlled by injector selection signals from an engine controller, the engine controller, in response to varying engine loads, selecting any number of operative fuel injectors less than the maximum number of cylinders for operation, the vehicle further including a transmission, a rear axle, and a chassis, the improvement comprising:

means for connecting each fuel injection firing signal from the engine controller to a fuel injector; and means for cycling the fuel injector firing signal connecting means to all of the other cylinders in the engine in a sequential order, in the selected number of operative fuel injectors at one time.

2. The improvement of claim 1 wherein the cycling means comprises:

means for advancing the fuel injector connecting means one position to connect the selected number of fuel injector firing signals to different fuel injectors upon each sequential generation of the fuel injector signals for the selected number of cylinders.

3. The improvement of claim 1 wherein the interconnecting means comprises:

the engine rigidly fixed to the transmission; and a rigid torque tube rigidly fixed at one end to the transmission and rigidly fixed at a second end to the rear axle.

4. The improvement of claim 3 further comprising:

a universal pivotal connection connected between the vehicle chassis and one end of the engine.

5. The improvement of claim 1 wherein the interconnecting means, the engine and the transmission are substantially co-axial with a longitudinal axis of the vehicle.

6. The improvement of claim 1 further comprising:

means for pivotally connecting the engine to the vehicle chassis for pivotal movement of the rear axle about an axis horizontally transverse to a longitudinal axis of the interconnecting means with respect to the vehicle chassis.

7. The improvement of claim 6 wherein the pivotally connecting means further comprises:

means for allowing the interconnecting means to pivot about two mutually exclusive axes with respect to the vehicle chassis.

8. In a vehicle with an engine having a plurality of cylinders, each provided with a fuel injector for injecting fuel into each cylinder on a timed basis controlled by injector selection signals from an engine controller, the engine controller, in response to varying engine loads, selecting any number of the maximum number of cylinders for operation, the engine mounted in a vehicle having a transmission, a rear axle, and a chassis, the improvement comprising:

means for connecting each fuel injection firing signal from the engine controller to a fuel injector;

means for cycling the fuel injector filing signal connecting means to all of the cylinders in the engine in a sequential order, in the selected number of operative fuel injectors at a time;

means for rigidly interconnecting the engine, the transmission and the rear axle such that the natural frequency of oscillation of the rigidly interconnected engine, the transmission and the interconnecting means is higher than any vibrational frequency that can occur during operation of the engine;

means for pivotally connecting the engine to the vehicle chassis for pivotal movement of the rear axle about an axis horizontally transverse to a longitudinal axis of the interconnecting means with respect to the vehicle chassis;

the pivotally connecting means further including means for allowing the interconnecting means to pivot about two mutually exclusive axes with respect to the vehicle chassis; and the pivotally connecting means including:
a pivot bar connected to and extending from the engine; and
means, fixed to the chassis, for slidably receiving the pivot bar and allowing rotation of the pivot bar about a longitudinal axis of the pivot bar.

9. The improvement of claim 8 wherein the pivotally connecting means allows rotation of the pivot bar about two mutually exclusive axes.

10. In a vehicle with an engine having a plurality of cylinders, each cylinder provided with a fuel injector for injecting fuel into each cylinder on a timed basis controlled by injector selection signals from an engine controller, the engine controller, in response to varying engine loads, selecting any number of the maximum number of cylinder for operation, the vehicle further including a transmission, a rear axle, and a chassis, the improvement comprising:

means for connecting each fuel injector firing signal from the engine controller to a fuel injector;

means for cycling the fuel injection firing signal connecting means to all of the cylinder in the engine in a sequential order, in the selected number of operative fuel injector at a time;

means for rigidily interconnecting the engine, the transmission and the rear axle such that the natural frequency of oscillation of the rigidly interconnected engine, the transmission and the interconnecting means is higher than any vibrational frequency that can occur during operation of the engine;

means for pivotally connecting the engine to the vehicle chassis for pivotal movement of the rear axle about an axis horizontally transverse to a longitudinal axis of the interconnecting means with respect to the vehicle chassis, the pivotally connecting means including means for allowing the interconnecting means to pivot about two mutually exclusive axes with respect to the vehicle chassis; and damping means, coupled to the pivot bar, for dampening longitudinal movement of the pivot bar.

11. The improvement of claim 10 wherein the dampening means comprises:

force absorption means, coupled to the pivot bar, for absorbing forces exerted on the pivot bar before the forces impact on the vehicle frame.

12. The improvement of claim 11 wherein the force absorption means comprises:

a piston rod coupled to the pivot bar and to a piston slidably mounted in a closed housing;

the housing fixedly connected to stationary vehicle structure;

the piston forming first and second separate fluid filled chambers in the housing on opposite sides of the piston; and a restrictor orifice formed in the piston creating a restrictive fluid flow path between the first and second chambers.

13. The improvement of claim 12 wherein the force absorption means further comprises:

a source of torque compensating fluid on the vehicle generating a fluid pressure proportional to transmission torque; and means, coupled to the source and to the first and second chambers in the piston housing, and responsive to longitudinal movement of the piston rod, for controlling fluid flow to and from the first and second chambers to modulate fluid flow between the first and second chambers in proportion to the magnitude of the longitudinal movement of the piston rod.

14. The improvement of claim 13 wherein the fluid flow controlling means comprises:

a valve spool slidably mounted in a closed housing and coupled to the pivot bar, the valve spool movable between a first position blocking fluid flow between the source and one of the first and second chambers, and a second position directing fluid flow from the source to one of the first and second chambers depending upon the direction of movement of the valve spool.

15. The improvement of 14 wherein the valve spool is a bi-directionally movably valve spool.

16. The improvement of claim 14 further comprising:

a check valve disposed between the source and the valve spool to prevent back flow from the valve spool to the source.

17. The improvement of claim 14 wherein:

the closed housing containing the valve spool is stationarily mounted with respect to the vehicle.

18. In a vehicle having an engine, a transmission, a rear axle and a chassis, the improvement comprising:

a rigid member, independent of the chassis, rigidly interconnecting the engine, the transmission and the rear axle of a vehicle to substantially prevent rotational vibrations induced by the engine and rear wheels of the vehicle from being transmitted to the vehicle chassis.

19. The improvement of claim 18 wherein:

the natural frequency of oscillation of the rigidly interconnected engine, the transmission and the rigid member is higher than any vibrational frequency that can occur during operation of the engine.

20. The improvement of claim 19 wherein the interconnecting means comprises:

the engine rigidly fixed to the transmission; and a rigid torque tube rigidly fixed at one end to the transmission and rigidly fixed at a second end to the rear axle.

21. The improvement of claim 20 further comprising:

a universal pivotal connection connected between the vehicle chassis and one end of the engine.

22. The improvement of claim 19 further comprising:

means for pivotally connecting the engine to the vehicle chassis for pivotal movement of the rear axle about an axis horizontally transverse to a longitudinal axis of the interconnecting means with respect to the vehicle chassis.

23. The improvement of claim 22 wherein the pivotally connecting means further comprises:

means for allowing the interconnecting means to pivot about two mutually exclusive axes with respect to the vehicle chassis.

24. In a vehicle having an engine, a transmission, a rear axle, and a chassis, the improvement comprising:

means for rigidly interconnecting the engine, the transmission and the rear axle such that the natural frequency of oscillation of the rigidly interconnected engine, the transmission and the interconnecting means is higher than any vibrational frequency that can occur during operation of the engine;

means for pivotally connecting the engine to the vehicle chassis for pivotal movement of the rear axle about an axis horizontally transverse to a longitudinal axis of the interconnecting means with respect to the vehicle chassis; and dampening means, coupled to the pivotally connecting means, for dampening longitudinal movement of the pivotally connecting means.

25. The improvement of claim 24 wherein the dampening means comprises:

force absorption means, coupled to the pivotally connecting means, for absorbing forces exerted on the pivotally connecting means before the forces impact on the vehicle frame.

26. The improvement of claim 25 wherein the force absorption means comprises:

a piston rod coupled to the pivot bar and to a piston slidably mounted in a closed housing;

the housing fixedly connected to stationary vehicle structure;

the piston forming first and second separate fluid filled chambers in the housing on opposite sides of the piston; and a restrictor orifice formed in the piston creating a restrictive fluid flow path between the first and second chambers.

27. The improvement of claim 25 wherein the force absorption means further comprises:

a source of torque compensating fluid on the vehicle generating a fluid pressure proportional to transmission torque; and means, coupled to the source and to the first and second chambers in the piston housing, and responsive to longitudinal movement of the piston rod, for controlling fluid flow to and from the first and second chambers to modulate fluid flow between the first and second chambers in proportion to the magnitude of the longitudinal movement of the piston rod.

28. The improvement of claim 27 wherein the fluid flow controlling means comprises:

a valve spool slidably mounted in a closed housing and coupled to the pivot bar, the valve spool movable between a first position blocking fluid flow between the source and one of the first and second chambers, and a second position directing fluid flow from the source to one of the first and second chambers depending upon the direction of movement of the valve spool.

* * * * *